United States Patent [19]

Sedwell

[11] 3,722,899
[45] Mar. 27, 1973

[54] SEAL
[75] Inventor: Alfred James Sedwell, Bury, England
[73] Assignee: General Engineering Company (Radcliffe) Limited
[22] Filed: Aug. 3, 1971
[21] Appl. No.: 168,609

[30] Foreign Application Priority Data
Aug. 5, 1970  Great Britain.....................37,701/70

[52] U.S. Cl. ....................277/237, 34/242, 118/405
[51] Int. Cl. ...........................................B05c 11/115
[58] Field of Search............277/237, DIG. 7; 34/242; 118/405

[56] References Cited

UNITED STATES PATENTS

| | | | |
|---|---|---|---|
| 2,367,174 | 1/1945 | Renkin | 34/242 |
| 3,460,359 | 8/1969 | Shiffer | 277/237 |
| 3,544,388 | 12/1970 | Russell | 118/405 |

Primary Examiner—Joseph R. Leclair
Assistant Examiner—Robert I. Smith
Attorney—Salter & Michaelson

[57] ABSTRACT

This invention provides a seal for closing an entry or exit aperture of an apparatus in which a moving strip of material is to be treated while in either a partial vacuum or while in a pressurized container, the seal serving completely to close the entry or exit aperture periodically and to deform as the material under treatment moves so that no appreciable drag is imparted to the material and then to open slightly to allow the seal to become undeformed before closing again upon the material so that the increments of time for which the seal is open are small and thus passage of fluid across the seal is minimized thereby to enable the required degree of vacuum or pressure to be maintained without imposing undue stress upon the mechanism used to create the vacuum or pressure conditions required.

9 Claims, 5 Drawing Figures

Patented March 27, 1973
3,722,899
2 Sheets-Sheet 1
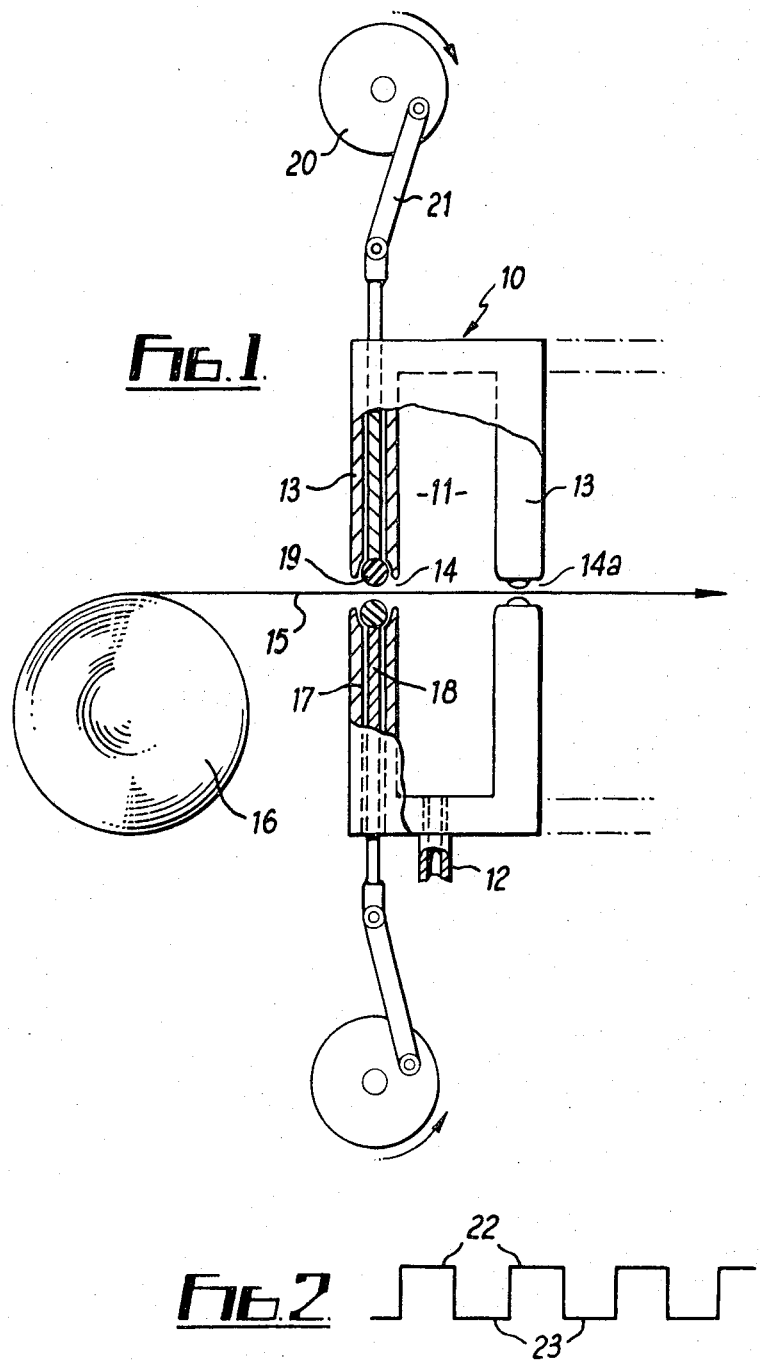
INVENTOR:
ALFRED JAMES SEDWELL
BY
SALTER & MICHAELSON,
Attorneys.

INVENTOR:
ALFRED JAMES SEDWELL
BY
SALTER & MICHAELSON,

SEAL

This invention concerns an improved seal, and particularly though not exclusively a seal adapted for use in apparatus of the kind used for the treatment of continuous strip material by vacuum deposition onto the strip of a coating of for example protective material.

In apparatus of the kind used for vacuum deposition it is known to provide at the inlet and outlet of a vacuum treatment chamber a series of seals which serve effectively to incrementally reduce the pressure from atmospheric to a vacuum of the order $10^{-4}$ Torr within the treatment chamber. In such an arrangement of seals it has been the practice to use precision machined elements for producing the seals and whilst such sealing arrangements are capable of being used in an effective manner they possess certain inherent disadvantages. One disadvantage lies in the fact that the seals are expensive to produce and despite the care with which they are made they have inherent leak paths thus making it necessary to employ high capacity pumping equipment to compensate for the leakage between the seal elements and the material to be treated. Since high capacity pumping equipment is used the capital cost of the equipment is high as in fact is the running and maintenance cost.

It has recently been proposed to use a sealing arrangement which basically relies upon the use of a series of columns of particulate material for creating the seals and thus is considered to be advantageous since the cost of producing the seals is thought not to be as high as heretofore since the need to produce seal elements to close machining tolerances is eliminated or at least substantially reduced. It is also thought that, due to the effectiveness of sealing achieved by the use of particulate material, the capacity of the pumping equipment can be lower whilst still achieving the desired degree of vacuum and thus the capital cost of equipment should be capable of being reduced.

The applicant have now appreciated that if the entry and exit apertures for material to be processed can be completely closed for periods of time during the feeding of material through the apparatus an even more efficient sealing arrangement will result. Such a sealing arrangement is thought to be most advantageous if employed at the outermost of the entry and exit series of seals although it may also be used additionally at other positions in each series of seals.

The principal object of the present invention is to provide a seal arrangement in which the seal entry can be, in conjunction with the material to be processed, completely closed during passage of the material through the apparatus.

According to the present invention a seal is characterized in that it includes relatively moveable opposed shutters, each having in its edge region adapted to lie adjacent a material to be processed a deformable element adapted to be placed in contact with the material to be processed, there being means associated with at least one of the shutters whereby it may be caused sequentially to move towards and away from the other shutter to remain in close proximity thereto until the limit of deformation of the deformable element has been reached and then to be moved away from the other shutter for a period of time sufficient to allow recovery of the deformable element to its original position prior to being moved again towards the other shutter.

Preferably both of the shutters are associated with means adapted to cause sequential movement.

In one form of apparatus the means adapted to cause movement of the shutters includes electrical or electronic equipment adapted to produce a square wave output signal, the latter being adapted to cause said shutter movements.

The invention will now be described further, by way of example only, with reference to the accompanying diagrammatic illustrations, in which:

FIG. 1 is a diagrammatic illustration of a seal made in accordance with the invention;

FIG. 2 is a representation of an electrical wave form produced by an apparatus arranged to control seal movements;

Figure 3:
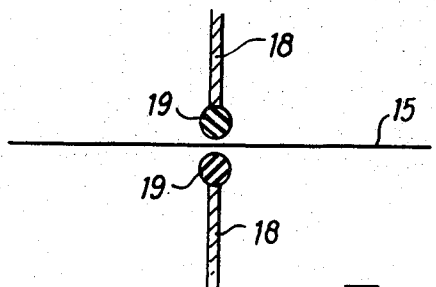
FIGS. 3 and 4 are respectively illustrations of parts of the seal of FIG. 1 in an open and closed position.

In the following description only one seal will be referred to but of course in an apparatus for use in the treatment of material under conditions of vacuum or pressure at least two such seals are contemplated.

The seal as shown in FIG. 1 includes a housing 10 having therein a chamber 11 connected through a conduit 12 to a pumping means (not shown) which, in an apparatus incorporating a vacuum treatment chamber (not shown), is adapted partially to evacuate the seal chamber 11.

In opposed walls 13 of the housing 10 are provided apertures 14 and 14a through which material 15 passes to enter the chamber 11 via aperture 14 and through which material 15 leaves the chamber 11 via aperture 14a from a supply reel 16 of material 15. In these walls 13 are provided opposed pairs of shutter guides 17, one pair being located at each side of the housing 10. The shutter guides of a pair 17 are located one at each side of the material entry aperture 14. Within each guide 17 is a slideable shutter element 18 having at its free edge, that is the edge nearest the material entry aperture 14, a flexible material element 19 preferably of round cross section and preferably made from soft rubber. Other soft deformable but impervious material may be used in place of rubber.

The shutters 18 are connected to a means for causing them to move in their respective guides 17 towards and away from each other in synchronism. Conveniently the means for moving the shutters is in the form of a system including an eccentric 20 and link 21.

To operate the eccentric 20 and link 21 there is provided electrical apparatus (not shown) adapted to produce an output signal of square wave form as shown in FIG. 2. The peaks 22 and valleys 23 of the wave correspond to top and bottom dead center positions of the eccentric 20 respectively.

Figure 4:
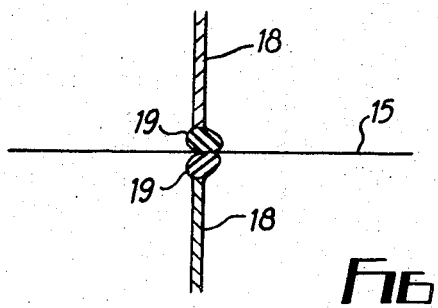

Thus as the signal is emitted the shutters 18 will, assuming them initially to be open (as shown in FIG. 3), move towards each other, remain in a closed position (as shown in FIG. 4) for an increment of time, and then move apart to remain apart for a further increment of time.

Now assuming that the apparatus is in use and a strip 15 of material is being passed through the seal then initially (again assuming the shutters 18 to be open) the shutters 18 will move towards each other completely to close the inlet aperture 14 in the housing 10. As the material 15 continues to move into the chamber 11 in the housing 10 which is evacuated to a pre-determined degree of vacuum by the pump, the flexible material 19 on the shutter edges will be deformed (as shown in FIG. 4) thus maintaining the seal whilst allowing movement of the material 15. Under influence of the square wave signal (as shown in FIG. 2) the shutters 18 will, after a short increment of time, move apart to allow the flexible material 19 to return to its original undeformed condition. The shutters 18 are now again moved to the closed position to seal the inlet aperture 14 completely.

Clearly whilst the shutters 18 are closed onto the material 15 there will be no leakage path and equally clearly whilst they are open there will be a leakage path but by arranging for shutter movement to be small the leakage path may be kept within acceptable dimensions for example it is envisaged that the gap between the flexible material 19 of the shutters and the material 15 will not exceed 0.1 inch when the shutters 18 are fully retracted from the material 15 and in fact a gap of 0.05 inch is thought to be obtainable.

The ratio of the time for which the shutters 18 are closed to the time for which they are open will be dependent upon the wave form and this can be modified from the form illustrated in FIG. 2 by the use of modulating equipment so that for example the increment of time for which the shutters 18 are closed will be greater than the time for which they are open. The speed at which the material 15 passes through the seal will be related to the wave form used to operate the shutters 18 in such manner that whilst the shutters 18 are closed there will be no slippage of material between the flexible elements 19. This is desirable (particularly at the outlet seal) to obviate the possibility of damaging or marking a coating put onto the material 15 in the treatment chamber.

It will be appreciated that, whilst there has been reference to the use of a mechanical means for causing actual movement of the shutters 18 in response to the output signal, it is possible to move the shutters 18 by purely electrical or electronic means, and such a mode of operation is thought to be desirable where the frequency of movement of the shutters 18 is high.

Figure 5:
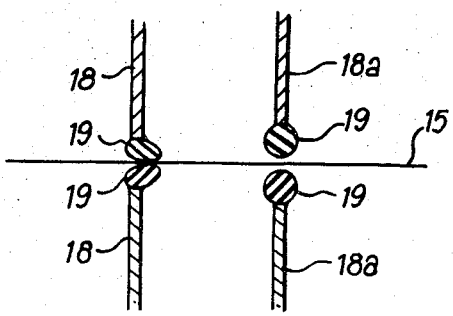
FIG. 5 is a view similar to FIG. 3 or 4 showing a modification.

In a modification of the seal described above it is possible as shown in FIG. 5 to provide, at the entry to the chamber 11, a seal consisting of two sets of shutters 18 and 18a. In this case the shutter movements of one set will be 180° out of phase with the movements of the other set of shutters so that at no time will there be a gap between the material and the shutters through which leakage can occur.

It will also be appreciated that whilst reference has been made to the use of a vacuum pump in association with the chamber 11 it is also possible to use the seal in apparatus designed for the processing of material under conditions of elevated pressure. In such a case the pumping arrangements would be such as to pressurize the chamber 11.

It is possible to have one of the shutters 18 fixed in position and to move only the other shutter 18 towards and away from the material. In this case slight deviation in the path of movement of the material will take place but this will not, it is thought, have any adverse effect on the material.

It will also be apparent that in some cases the chamber 11 will be associated with a further chamber (indicated in FIG. 1 in broken line) in which the degree of vacuum or pressure is again to be controlled by pumping equipment. The seal between the first and second chambers may in fact be common to both chambers and thus seal 14a serves to seal chamber 11 from the next chamber. Alternatively seal 14a may be in the form of a column of particulate material as recently proposed by the present.

I claim:

1. A seal including at least one pair of relatively movable shutters, deformable edge regions for each of said shutters along adjacent edges of said shutters, means associated with at least one of the shutters of the at least one pair of shutters to cause movement thereof alternatively towards and then away from the other shutter of the pair and to retain the shutters in close proximity with each other for an increment of time so as, in use, to cause the said deformable edge regions of the said shutters to contact a material as it is passed through said seal, the said increment of time being that taken fully to deform said deformable edge regions of said shutters, and then to separate the shutters to allow said deformable edges to return to an undeformed condition before they again become located in said close proximity with each other.

2. A seal as set forth in claim 1 in which both shutters of a pair of shutters are associated with means for causing movement thereof.

3. A seal as set forth in claim 1 in which the means for causing shutter movement includes electrical apparatus adapted to produce a square wave output signal, said signal serving to control said shutter movement.

4. A seal as set forth in claim 1 in which the means for causing shutter movement includes electrical apparatus adapted to produce a square wave output signal, an eccentric, a link from said eccentric to said shutter and means for causing movement of said eccentric by said output signal from said electrical apparatus.

5. A seal as set forth in claim 1 in which said deformable edge regions of said shutters are soft rubber.

6. A seal as set forth in claim 1 in which said deformable edge regions of said shutters are circular in cross-section when undeformed.

7. A seal as set forth in claim 1 in which two pairs of shutters are provided, said shutters of one pair being movable 180° out of phase with said shutters of said other pair.

8. A seal as set forth in claim 1 in which said shutters are slidable in slides in a wall of a chamber through which a strip of material is to pass, means being provided in association with said chamber to create and maintain a pressure therein different to prevailing atmospheric pressure.

9. A seal as set forth in claim 8 in which said means associated with said chamber is adapted to provide and maintain a sub-atmospheric pressure in said chamber.

* * * * *